May 23, 1961  A. M. STONER  2,985,456
MULTIPLE-SCREW ACTUATED COLLET CHUCK
Filed Nov. 20, 1959  3 Sheets-Sheet 3

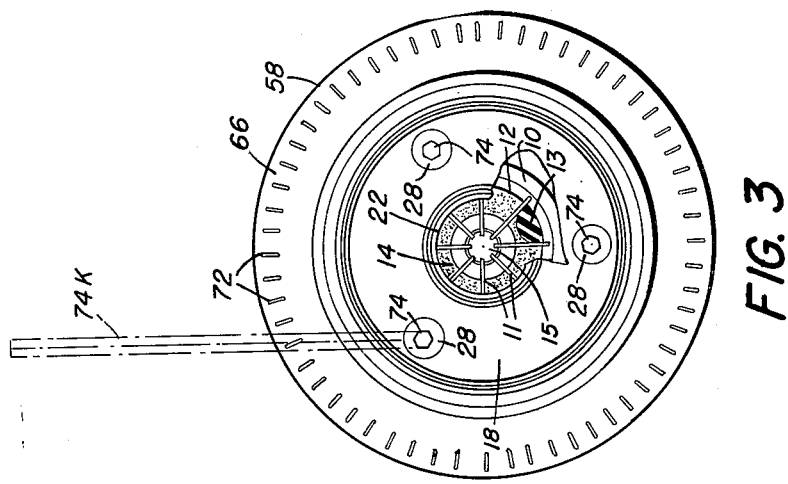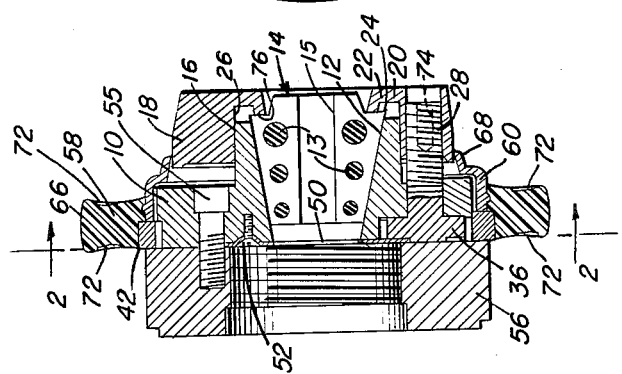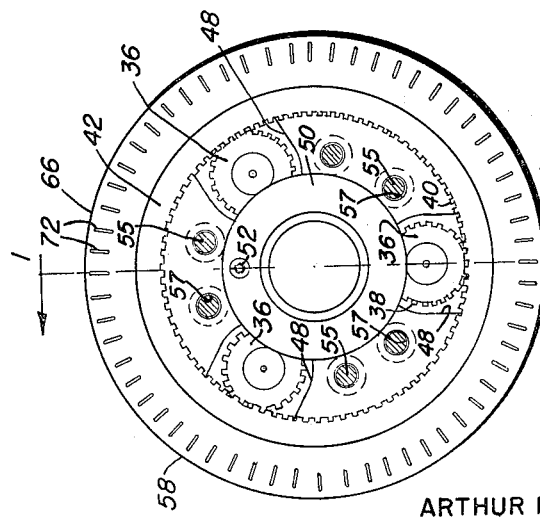

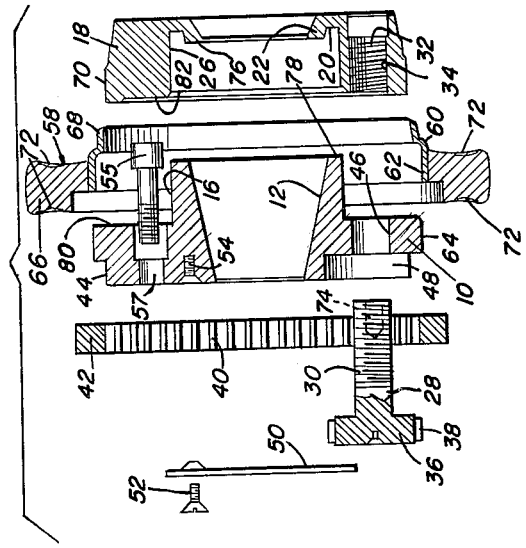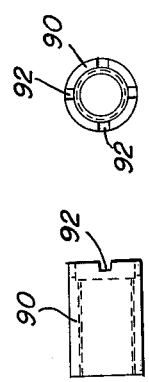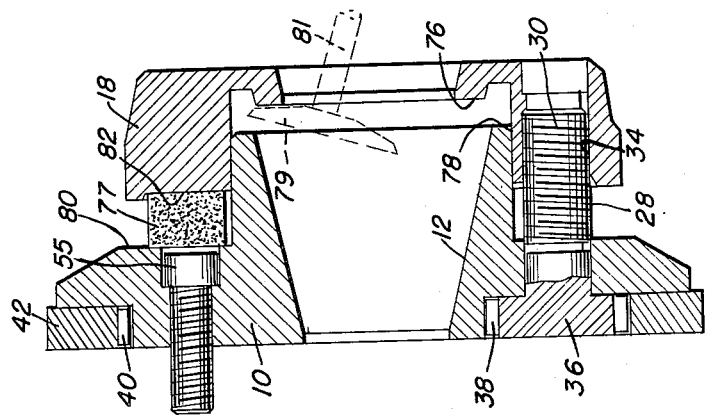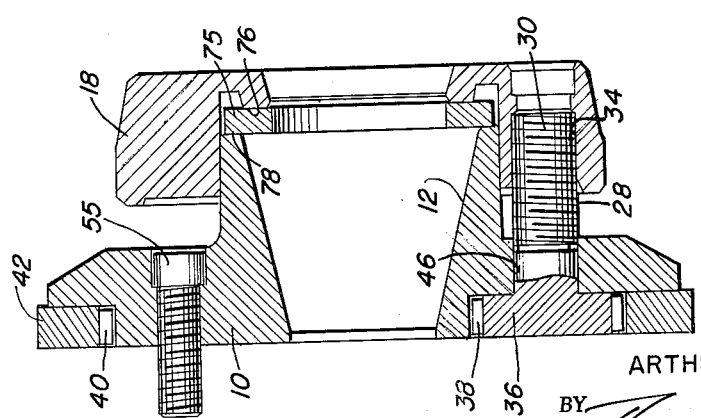

INVENTOR
ARTHUR MERRICK STONER
BY Raymond W Wolton
ATTORNEY

United States Patent Office 2,985,456
Patented May 23, 1961

2,985,456
MULTIPLE-SCREW ACTUATED COLLET CHUCK

Arthur M. Stoner, Madison, Conn., assignor to The Jacobs Manufacturing Company, West Hartford, Conn., a corporation of New Jersey Filed Nov. 20, 1959, Ser. No. 854,432

12 Claims. (Cl. 279—51)

This invention relates to a chuck and particularly to a collet chuck of the handwheel type adapted for use on lathes.

Collet chucks of conventional types have been produced primarily for industrial uses requiring high precision and accordingly, the manufacturing costs have been relatively high. In accordance with the present invention, while a high degree of accuracy has been achieved, a relatively simple and inexpensive structure has been evolved containing relatively few parts and adapted for ready assembly and disassembly for any maintenance or renewal of components. One of the important aspects of the present invention contributing appreciably to the accuracy achieved is the provision of the jaw contacting surface of the nose piece of the chuck in a plane precisely perpendicular to the axis of rotation of the chuck. Such a perpendicular relationship renders it impossible for one jaw of the collet chuck to be shifted axially or radially ahead of the others, thereby assuring positioning of a work piece concentric with respect to the axis of rotation of the chuck.

The chuck according to the present invention comprises a body containing an axially divergent internal cam surface adapted to receive a collet, a pressure member or nose piece axially movable relative to the body adapted to engage the collet, a plurality of screws interconnecting the member and body, and gear means carried by the body in driving engagement with the screws for simultaneous actuation thereof. The gear means preferably includes a handwheel mounted on the body and at least one of the screws is provided with wrench engaging means to facilitate locking the assembly when the work is inserted. The pressure member may contain an opening through which access is gained to the wrench engaging means carried by one or more of the screws. The gear means preferably includes a ring gear having internal teeth journalled on the body with the teeth themselves in bearing relationship with the body. Each of the screws preferably carries a pinion in driving engagement with the ring gear and the screws are preferably disposed in parallel relationship. Three such screws are preferably employed to maintain the plane of the jaw contacting surface of the nose piece perpendicular to the axis of rotation at all times.

The pressure member is preferably telescopically mounted on the body and preferably has an internal flange overhanging the cam surface for engagement with the forward portion of a collet. The screws are preferably threadedly engaged with the pressure member and freely rotatable in the body and the cam surface adapted to receive the collet is preferably conical.

A more complete understanding of the invention will follow a description of the accompanying drawings wherein:

Fig. 1 is a sectional elevation, taken along line 1—1 of Fig. 2, of a preferred form of chuck in accordance with the present invention, depicted in association with a collet and a threaded face plate;

Fig. 2 is a rear elevation taken along line 2—2 of Fig. 1 with the collet omitted;

Fig. 3 is a front elevation looking from the right of Fig. 1;

Fig. 4 is an exploded view depicting the components shown in Fig. 1;

Fig. 9 is a sectional elevation illustrating a step in the production of the chuck of Fig. 1;

Fig. 10 is a sectional elevation illustrating another step in the production of the chuck of Fig. 1;

Fig. 11 is a side elevation showing one of the bushings employed in the chuck of Fig. 7;

Fig. 12 is an end elevation of the bushing of Fig. 7; and

Fig. 13 is an elevation of one of the thrust washers used in the chuck of Fig. 5.

Figure 5:
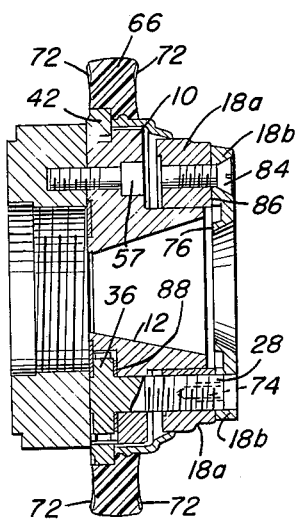
Fig. 5 is a sectional elevation, taken along line 5—5 of Fig. 6, depicting a modified form of the invention assembled on a threaded face plate.

Referring to Figs. 1 to 4 particularly of the drawings, the chuck body 10 contains a central conical cam surface 12 for the reception of a known type of collet 14 whose outer periphery engages the cam surface 12 in a complementary fashion. The collet comprises a plurality of equally spaced radially extending hard metal jaw plates 11 bonded to one another by flexible material, such as rubber 13 disposed between them, an axial opening 15 extending through the collet for the reception of a cylindrical work piece. Since the jaws are capable of relative movement, it is important that they be shifted equally, both axially and radially, to assure concentric clamping of the work with respect to the axis of rotation of the chuck. The forward portion of the body 10 provides a reduced cylindrical surface 16 on which the pressure member or nose piece 18 is reciprocably mounted. The forward portion of the nose piece 18 assumes the form of an inwardly directed radial flange 20 terminated in a rearwardly directed flange 22 having a working face 76 lying in a plane normal to the chuck axis for the application of pressure against the front edges 24 of the jaws of the collet 14 to effect contraction of the collet to grip a work piece.

The nose piece 18 has an internal cylindrical bore 26 which bears on the cylindrical surface 16 provided by the body, and relative movement in an axial direction is achieved by means of three or more screws 28 having threads 30, as best illustrated in Fig. 4, engaging complementary threads 32 provided in openings 34 formed in the nose piece 18 and corresponding in number to the number of screws employed. The screws 28 are provided with integral pinions 36 on their left ends as viewed in Figs. 1 and 4, the teeth 38 of the pinions meshing with the teeth 40 formed on an internal ring gear 42 which is journalled on a reduced cylindrical step 44 formed at the rear portion of the body 10. The teeth 40 of the internal ring gear 42 directly engage the axial surface provided by the step 44 to provide a very simple and effective bearing arrangement. The screws 28 are introduced through openings 46 formed in the body 10 in registration with the openings 34 of the nose piece 18, the pinions 36 occupying recesses 48 provided in the body 10. With the ring gear 42 assembled on the body 10 and the screws 28 threaded into the openings 34 of the nose piece 18 as depicted in Fig. 1, a sheet metal cover plate 50 is assembled against the rear surface of the body 10 by means of a screw 52 received in a threaded opening 54. This cover plate 50 serves as a seal and prevents the entrance of foreign material into the teeth of the gear mechanism. The chuck is depicted in Fig. 1 as assembled on a face plate 56 by means of cap screws 55 extending through openings 57 formed in the body 10. The face plate is internally threaded for attachment to the spindle nose of a lathe (not shown). The ring gear 42, as will be clear from Fig. 4, is suitably secured to a handwheel 58 having an internal ring 60 whose internal surface 62 is arranged in spaced relation to a cylindrical surface 64 provided by the body 10. The rim 66 of the handwheel intended for engagement by an operator is secured to the ring 60 in a suitable fashion, this rim having been depicted in the drawings as composed of a plastic composition molded on the ring 60 in interlocking relationship. The forward portion of the ring 60 is formed with an inclined flange 68 which assumes a position relatively close to the cylindrical surface 70 formed on the nose piece 18 to exclude foreign matter from the internal portions of the chuck. The rim of the handwheel is provided with indentations 72 on its radial surfaces to facilitate gripping by the operator.

Assuming the chuck to be mounted on a face plate carried by the spindle nose of a lathe, and assuming the collet to be in a contracted condition in which the opening 15 is too small to receive a particular work piece, the handwheel 58 will be turned in the proper direction about its axis of rotation relative to the chuck body 10, causing the ring gear 42 to rotate and impart rotation to the pinions 36 and to their screws 28, projecting the nose piece 18 forwardly and allowing the collet 14 to move forwardly along the cam surface 12 under the expanding effect of its rubber bonding material 13, until the outward radial movement of the chuck jaws enlarges the opening 15 sufficiently to exceed the size of the work piece. Then the work piece will be inserted in the chuck and the handwheel will be rotated in the opposite direction to rotate the screws 28 and retract the nose piece 18 causing the collet jaws to be contracted by their axial movement in engagement with the cam surface 12 until the jaws bite into the work piece and prevent further rotation of the handwheel.

Throughout the axial movement of the nose piece 18, the plane of the working face 76 remains exactly normal to the axis of rotation of the chuck by virtue of the fact that the ring gear 42 assures equal amounts of rotation to the three screws 28 and therefore equal axial movement at each of the three arcuately spaced openings 34 whose threads 32 cooperate with those of the screws 28. Consequently, the axial movements and resulting radial movements imparted to each chuck jaw will be the same. By thus employing three screws, the perpendicular relationship of the working face 76 with respect to the axis of rotation of the chuck is always maintained. Such results can not be achieved by the use of a single screw as employed in conventional chucks of the prior art. Whenever the nose piece is relieved of axial pressure, it can be moved back and forth very rapidly, due to the high gear ratio which causes the pinions 36 to rotate several times while the handwheel 58 is turned through a single revolution.

After the handwheel has been thus operated to retract the nose piece 18 onto the body 10 to produce inward movement of the collet 14 to grip the work piece, a locking effect or further tightening of the collet jaws about the work piece can be produced by the introduction of a suitable tool such as a wrench of the hexagonal key type, into a socket 74 formed in the end of each screw 28. Preferably the hex key 74K (Fig. 3) is L-shaped and the operator inserts the short arm thereof into the hexagonal socket 74 and turns it by grasping the radial arm near its outer end. The radial arm may be of any desired length and may extend far beyond the periphery of the handwheel 58. This locking effect results from the greater torque applicable by the key direct to a screw 28 than can be applied thereto by the handwheel through the relatively high ratio provided by the ring gear 42 and pinions 36. It will be clear that any movement imparted to one of the screws will be transmitted to the others as well through the ring gear 42. If desired, keys can be inserted in two of the screws at once if even greater turning forces are desired.

Instead of a hexagonal socket 74, other forms of wrench engaging means may be provided on the screw 28 for cooperation with various types of wrenches or screwdrivers. When it is desired to remove the work piece from the chuck, the wrench or other tool will be used again, this time to unlock the mechanism for operation of the handwheel to rotate the ring gear 42 and its pinions 36 to project the nose piece 18 forwardly relative to the body 10, permitting expansion of the collet 14 and release of the work.

The mode of assembly of the chuck contributes appreciably to the precision and reliable operation. A flat washer 75, as shown in Fig. 9, is interposed between the working face 76 of the pressure member or nose piece 18 and the forward radial surface 78 of the body 10. Then the three screws 28 are introduced through the openings 46 of the body 10 into the threaded openings 34 of the nose piece 18. There is a special technique involved in the insertion of the screws which will be described later in connection with a problem which arises in the use of the chuck. The screws are then tightened uniformly with a torque wrench to hold the nose piece and body uniformly tightly assembled with the interposed washer between them. The teeth of the internal gear 42 are partially engaged with one of the pinions 36 and then the other two pinions 36 are turned either clockwise or counterclockwise the least arcuate distance necessary to align the teeth 38 so that they will mesh with the teeth of the ring gear 42. Then the ring gear can be moved into its correct position in the groove 44 of the body 10. It has been found desirable to provide somewhat more than usual clearance between the threads 30 on the screws and the threads 32 provided in the openings 34 in order to accommodate slight variations required to effect this meshing of the pinion gears with the internal gear. The parts are then in the position shown in Fig. 9, with the working face 76 disposed in a plane precisely normal to the axis and maintained in that condition as long as the face is firmly clamped against the flat washer 75, which in turn seats against the precisely normal plane 78. However, the screws 28, which were under exactly the same tension when the torque wrench was applied, have deviated slightly from that condition in the process of meshing the gear teeth. At this stage the sheet metal cover 50, shown in Figs. 1 and 4, is applied and fixed by its screw 52.

The nose piece 18 is then removed from the subassembly by rotation of the ring gear 42 and pinions 36 to project the nose piece forwardly relative to the body, whereupon the washer 75 which had been interposed between the body and nose piece is removed. Then the nose piece is returned to its position on the body, care being exercised to maintain the same angular position relative to the screws so that the timing of the gears previously established will be maintained. Three rubber blocks 77, shown in Fig. 10, are now disposed substantially uniformly about the radial forward face 80 of the body for engagement with the radial rear face 82 of the nose piece, whereupon the pinions 36 are rotated by means of the ring gear 42 to retract the nose piece with respect to the body into firm engagement with these rubber blocks 77. The latter serve as springs to maintain axial stress on the screws 28 while permitting the nose piece to assume a location as determined by the working or pressure surfaces of the threads 30 of the screws against their complementary threads 32 formed in the openings 34 of the nose piece 18. The nose piece 18 yields to the reactive forces on the screw threads and automatically adjusts itself to a new position in which the axial tension on the screws 28 is restored to the original condition of stable equilibrium as it existed prior to the meshing of the gear teeth. In the new position, however, the nose piece has shifted slightly out of axial alinement with the body 10, and the plane of the working face 76 is no longer precisely perpendicular to the body axis. The next step in the process of manufacture and assembly is to restore the working face 76 to a perpendicular plane. With the parts in the Fig. 10 position, the chuck is rotated on its axis and the working face 76 of the nose piece is submitted to a grinding operation in a suitable fashion as by the insertion of a grinding wheel 79 mounted on a shaft 81 driven by a suitable motor, not shown. Then, after the working face 76 has been ground to lie in a plane perpendicular to the axis of rotation of the chuck, the nose piece 18 is disassembled from the body 10, the rubber blocks 77 are removed, a collet 14 is introduced into the body, and the nose piece 18 is restored to its former position on the body.

Replacement of the nose piece in the position it previously occupied presents a difficult problem of timing, not only during repeated removal and assembly by the manufacturer, but also whenever the consumer finds it necessary to substitute one collet for another. This problem is solved according to the present invention by properly relating the angular positions of the beginning portions of the threads 32 formed in the openings 34. If, for example, the angular position of the beginning of one of the threaded openings 34 were incorrect or late by an angle of, say, 90° relative to the correct starting position, it would be possible to engage the threads of this opening with the threads of its screw in either of two positions, the first being the position in which the screw members were originally assembled and the second, a position in which two of the screws engage their openings simultaneously and the third only after it has rotated 270° farther than the other two. This latter incorrect condition will impair the accuracy of the chuck by tilting the plane of the working face 76 from its normal relationship with respect to the axis of rotation and tend to produce binding. Since these difficulties could very readily occur in a chuck constructed in accordance with the procedures thus far described, serious problems might be anticipated in the field where such chucks are employed.

An appropriate way to obviate these problems, according to this invention, is to tap the three threaded openings 34 in the nose piece by the use of a lead screw tapping machine so as to start the thread in each of the openings at the same angular position relative to a radius extending from the axis of rotation of the chuck through the center of the respective opening. In this way, the angular rotation for each screw 28 to engage the thread 32 of its respective opening 34 in the nose piece is identical, regardless of which screw is brought into registration with which opening, thereby preventing incorrect meshing of the threads 32 formed in the nose piece 18 and the threads 30 of the three screws 28. Once the screws have been assembled in properly timed relationship in this manner, their timing will be maintained regardless of how frequently or how carelessly the user reassembles them with the nose piece.

Figure 6:
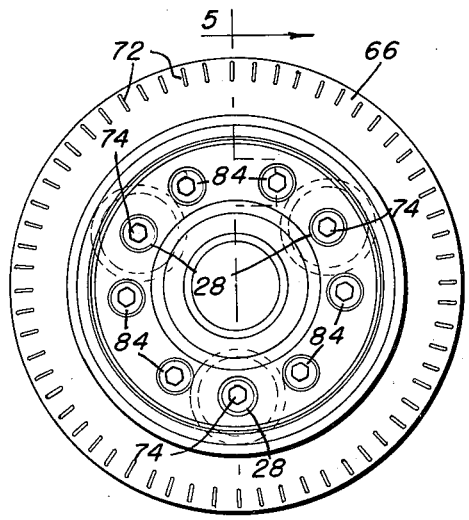
Fig. 6 is a front elevation of the modification depicted in Fig. 5.

The modification depicted in Figs. 5 and 6 contemplates a nose piece made of two parts including a ring 18a and a plate 18b secured together by means of screws 84. The ring 18a is preferably formed of soft steel and is provided with a forward face 86 which is machined to run true by the use of rubber blocks in somewhat the manner described in connection with the grinding of the face 76 of the nose piece of Fig. 4. Under these circumstances, assuming that the radial faces of the plate 18b have been ground so as to be perpendicular to the plate axis, when the plate is assembled on the ring 18a, the working face 76 will lie in a plane perpendicular to the axis of the chuck.

In this modification, there is interposed between each pinion 36 and the body 10, a thrust washer 88 having high anti-friction characteristics. The provision of such a thrust washer has been found to increase the gripping power appreciably for a given value of torque applied by the key or wrench received by each socket 74 of the screws 28. Such thrust washers will be particularly desirable in connection with chucks of larger sizes and it is contemplated that they may assume the form of plain bearings of the type depicted in Fig. 13, ball bearings or roller bearings.

Figure 7:
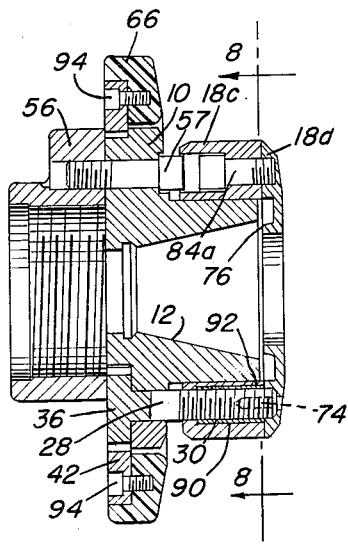
Fig. 7 is a somewhat fragmentary sectional elevation depicting another modified form of the invention mounted on a threaded face plate.
Figure 8:
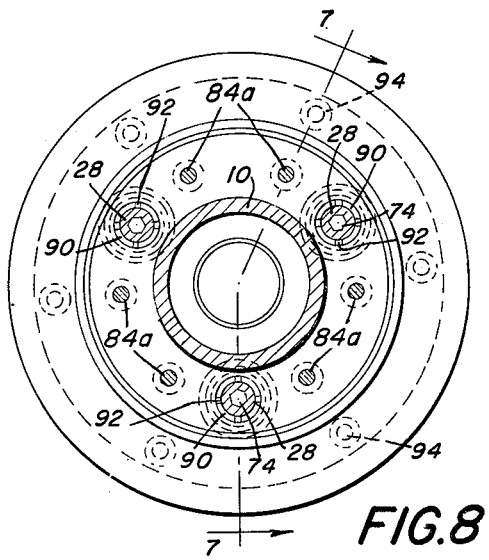
Fig. 8 is a sectional elevation taken along line 8—8 of Fig. 7.

In the modification depicted in Figs. 7 and 8, the nose piece is again in composite form, this time including a ring 18c secured to a plate 18d by means of screws 84a. In this case, internally threaded bushings or nuts 90, best shown in Figs. 11 and 12, are secured in the ring 18c, by adhesive or otherwise, for engagement with the threads 30 formed on the screws 28. These bushings or nuts have their forward edges provided with grooves or notches 92 for engagement by a suitable wrench, not shown. In assembling the chuck shown in Figs. 7 and 8, the face plate 56, pinions 36, screws 28, and ring gear 42 are assembled in the manner depicted in Fig. 7, whereupon the ring 18c is applied with its rear face in engagement with the forward face of the body 10. The gears are held against rotation while the three nuts 90 are advanced on the threads 30 of the screws 28 until they become seated and are then tightened to the same torque value, as determined by a torque wrench. Cement is then applied to permanently secure the nuts 90 to the ring 18c. Then the front face of the ring 18c is machined to render it perpendicular to the chuck axis so that when the nose plate 18d is applied, its working face 76 will likewise be perpendicular to the chuck axis for accurate engagement with the forward face of the collet to be installed. After the cement has cured, the nose piece will be removed from the body by rotation of the handwheel 58 whereupon the plate 18d will be secured to the ring 18c by means of the six cap screws 84a.

As shown in the embodiment of Figs. 7 and 8, the internal ring gear 42 may be secured to the handwheel 58 by means of a suitable number of screws 94. As will be apparent from Fig. 7, the plate 18d is provided with openings for registry with the wrench engaging sockets 74 of the screws 28 for the introduction of a wrench or other suitable key for use in locking the assembly in its work engaging position.

Whereas only three embodiments of the present invention have been described with reference to the accompanying drawings, such variations as will occur to those skilled in the art are contemplated by the appended claims. For example, the number of screws 28, pinions 36 and threaded openings 34 may be increased from three to a larger number with a corresponding decrease in the angular spacing therebetween. In the larger sizes of chucks it is desirable to employ as many as eight screws and pinions, the increase in number being advantageous in providing greater stability, efficiency and compactness of design, accompanied by a reduction in manufacturing cost.

I claim:

1. A chuck comprising a body containing an axially divergent internal cam surface adapted to receive a collet, a pressure member axially movable relative to said body adapted to engage said collet, a plurality of screws rotatable about mutually spaced axes interconnecting said member and body, and gearing carried by said body in driving engagement with said screws for simultaneous actuation of the latter.

2. A chuck as set forth in claim 1 wherein at least one of said screws is provided with wrench engaging means.

3. A chuck as set forth in claim 1 wherein said gearing includes a ring gear having internal teeth, and said body provides a journal for said ring gear engageable with said teeth.

4. A chuck as set forth in claim 1 wherein said gear means includes a pinion carried by each of said screws and an internal ring gear in mesh with each of said pinions rotatably carried by said body for synchronous actuation of said screws.

5. A chuck as set forth in claim 1 wherein said screws threadedly engage said member and rotate freely in said body.

6. A chuck comprising a body containing an axially divergent internal cam surface adapted to receive a collet, a nose piece slidably mounted on said body having a flange overhanging said cam surface adapted to engage said collet, at least three parallel screws rotatably carried by said body threadedly engaging said nose piece, a pinion received in said body secured to each of said screws, a ring gear having internal teeth journalled on said body and meshing with each of said pinions, and wrench engaging means provided on at least one of said screws accessible through said nose piece.

7. A chuck as set forth in claim 6 wherein internally threaded bushings secured to said nose piece threadedly receive said screws.

8. A mechanism comprising a body having a fixed work engaging face, a nose piece supported with respect to said body for movement toward and away from said face, at least three toothed pinions supported by said body for rotation about individual axes, said axes being parallel to each other and uniformly spaced, a screw rigidly connected to each pinion and extending toward the nose piece, the nose piece having at least three complementary threaded openings arranged for reception of the respective screws, and an annular element surrounding all of the pinions, said annular element meshing with the pinion teeth to constrain the pinions in rotation in unison, said nose piece having a work engaging surface located in a plane perpendicular to the axes of the screws and pinions, and manipulative means for rotating the annular member to move the nose piece toward and away from the body, with each threaded portion of the nose piece moving the same distance and with the movable work engaging surface being maintained in a perpendicular plane.

9. A mechanism according to claim 8, in which at least one of the pinions is shaped for the reception of a wrench whereby said pinion may be driven directly, said annular element being arranged to be driven by said one pinion and thereby drive the other pinions upon application of torque by a wrench to said one pinion.

10. A mechanism according to claim 9, in which the annular element comprises an internal gear mounted upon a handwheel, the handwheel being adapted to be grasped about its periphery for turning the pinions, the wrench having a lever arm extending from the pinion axis outwardly beyond the handwheel periphery, whereby the torque transmitted through the wrench has a greater leverage than the torque transmitted through the handwheel.

11. A mechanism according to claim 10, in which at least two of the pinions have wrench receiving attachments, whereby two of the pinions may be driven directly and simultaneously, said annular element being arranged to be driven by the two pinions and thereby to drive the remaining pinion or pinions with all pinions turning together at the same speed.

12. A chuck mechanism comprising a supporting body, a movable jaw actuating member supported with respect to the body for axial movement toward and away from the same, a plurality of screws mounted in the body for rotatable movement and restrained against axial movement relative to the body, each screw threadedly engaging the movable member, and gearing engaging the several screws for simultaneous action thereof.

References Cited in the file of this patent
UNITED STATES PATENTS

| | | |
|---|---|---|
| 2,293,176 | Sjogren | Aug. 18, 1942 |
| 2,311,258 | Sjogren | Feb. 16, 1943 |
| 2,508,731 | Stoner | May 23, 1950 |